(12) United States Patent
Ehrsam et al.

(10) Patent No.: US 7,258,309 B2
(45) Date of Patent: Aug. 21, 2007

(54) AUTOMATIC AND GUIDED SYSTEM FOR TRANSPORTING PEOPLE AND METHOD FOR CONTROLLING TRANSPORT MODULES RUNNING IN SUCH A SYSTEM

(75) Inventors: Jean Ehrsam, Clamart (FR); Jean-Paul Moskowitz, Paris (FR); Anselme Cote, Yerres (FR)

(73) Assignees: Alstom, Paris (FR); Regie Autonome des Transports Parisiens, Vincennes Cedex (FR)

( * ) Notice: Subject to any disclaimer, the term of this patent is extended or adjusted under 35 U.S.C. 154(b) by 0 days.

(21) Appl. No.: 10/478,490

(22) PCT Filed: May 6, 2002

(86) PCT No.: PCT/FR02/01549

§ 371 (c)(1),
(2), (4) Date: Sep. 8, 2004

(87) PCT Pub. No.: WO02/096737

PCT Pub. Date: Dec. 5, 2002

(65) Prior Publication Data

US 2005/0005813 A1    Jan. 13, 2005

(30) Foreign Application Priority Data

May 31, 2001    (FR) .................... 01 07161

(51) Int. Cl.
*B61L 21/00*    (2006.01)
*B60L 15/00*    (2006.01)

(52) U.S. Cl. ........................................ 246/20; 104/299
(58) Field of Classification Search ................ 104/287, 104/299; 246/218, 219, 20, 23, 24
See application file for complete search history.

(56) References Cited

U.S. PATENT DOCUMENTS

| 4,304,377 | A | * | 12/1981 | Pitard ..................... 246/34 CT |
| 4,467,430 | A | * | 8/1984 | Even et al. ................. 701/117 |
| 4,641,803 | A | * | 2/1987 | Brown et al. ........... 246/34 CT |
| 4,766,817 | A | * | 8/1988 | Uozumi ..................... 104/299 |
| 5,125,347 | A | * | 6/1992 | Takahashi et al. .......... 104/298 |

* cited by examiner

*Primary Examiner*—S. Joseph Morano
*Assistant Examiner*—Robert J. McCarry, Jr.
(74) *Attorney, Agent, or Firm*—Sughrue Mion, PLLC

(57) ABSTRACT

A system for automatic and guided transport of people, the system including: at least one running track having guide members for guiding transport modules; an electric power supply system comprising a sequence of power supply blocks; electric self-propelled transport modules travelling individually along the running track and fitted with a collector for picking up electric power supplied by the power supply blocks; and an electric power supply distributor controlled by a central control unit managing the progress of the transport modules by powering or unpowering various power supply blocks.

16 Claims, 1 Drawing Sheet

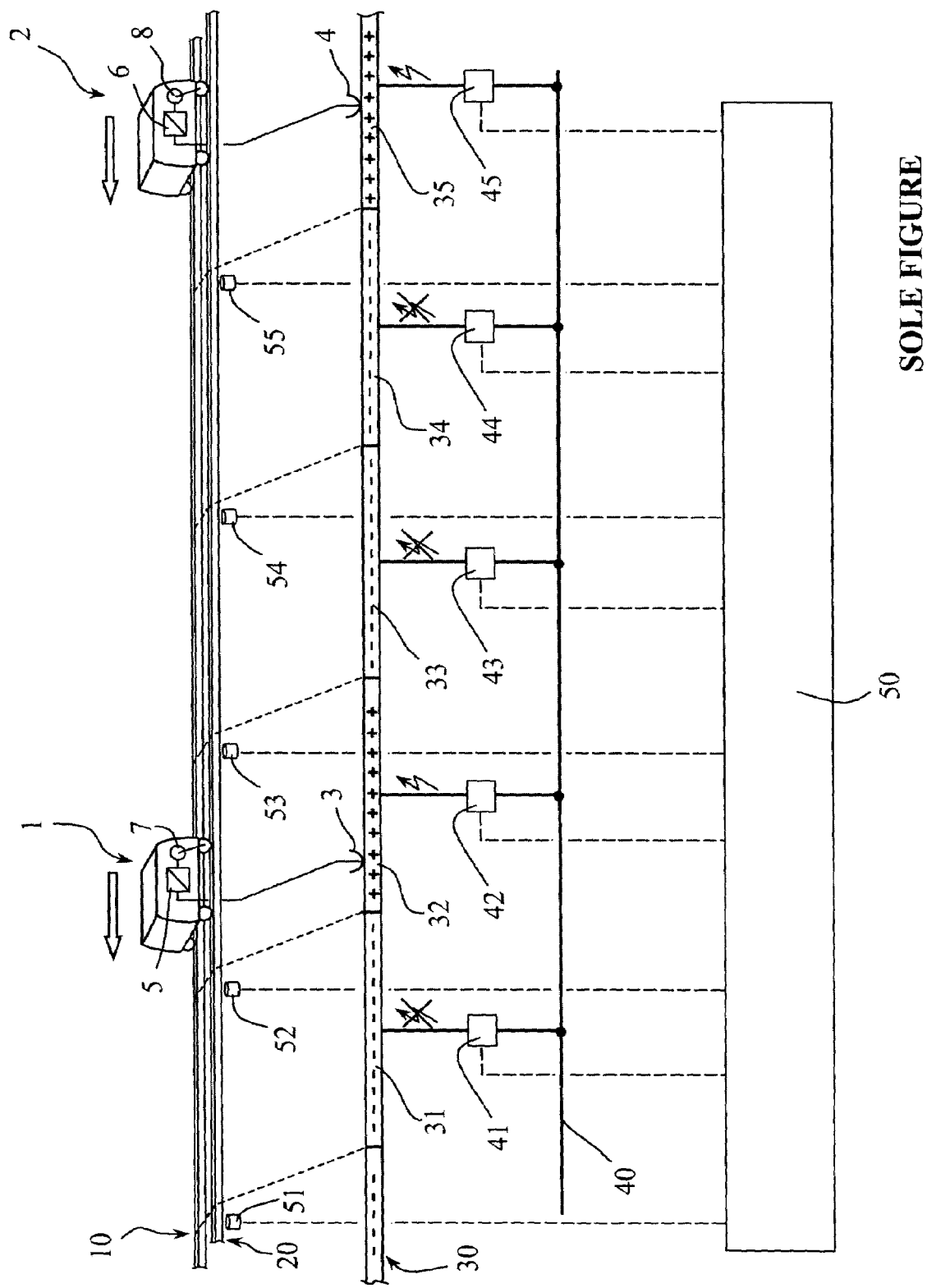
SOLE FIGURE

AUTOMATIC AND GUIDED SYSTEM FOR TRANSPORTING PEOPLE AND METHOD FOR CONTROLLING TRANSPORT MODULES RUNNING IN SUCH A SYSTEM

The present invention relates to a system for automatic and guided transport of people, designed with intrinsic safety and with regulation by electric power supply feed. The invention also relates to a method of controlling transport modules travelling in such a system.

Automatic and guided transport of people makes use of installations as different as elevators (lifts) and automatic urban railway systems (metros). An automatic metro is designed to take the place of conventional metro lines using drivers. An automatic metro train is intended to transport a large number of passengers over a length of line that is relatively long. An automatic metro generally has traction motors powered with electricity taken from a collector shoe in contact with a current conductor which is permanently live, e.g. a third rail extending along the entire length of the line, and each automatic metro train carries its own control and regulation system acting on the power fed to its traction motors as a function of signaling. Such an automatic metro installation suffers from the drawback of involving rolling stock and infrastructure that are quite complex and of requiring the presence of an expensive signaling and surveillance system to ensure that the installation is safe and in particular to prevent collisions between different automatic metro trains travelling on the same track.

The invention is intended to provide an automatic transport system requiring a low level of investment by combining in a single subsystem all of the functions usually performed by signaling, driving, and feeding electric power. For this purpose, the guided self-propelled vehicles are provided with fixed onboard functions which are actuated as a function of the presence or absence of a voltage on one or more electric power supply conductors on the ground and as a function of their position along the line.

The invention provides an automatic and guided system for transporting people, the system comprising:

- at least one running track having means for guiding transport modules, each transport module being constituted by a single self-propelled vehicle or a self-propelled vehicle associated with one or more other transport vehicles;
- an electric power supply system comprising a sequence of power supply blocks;
- electric self-propelled transport modules travelling individually along the running track and fitted with means for collecting electric power supplied by the power supply blocks, said transport modules moving automatically along the track when the collector means are electrically powered, and including brake means that come into operation when the collector means are no longer powered with electricity; and
- electric power distribution means comprising switch means which supply said electric power to the various power supply blocks and which are controlled by a central control unit managing the progress of the transport modules by causing the various power supply blocks to be powered or unpowered, the presence of a transport module on a power supply block preventing power being applied to one or more blocks situated behind the block that is occupied so as to maintain a safety distance between the various transport modules travelling independently along the track.

Preferably, the transport modules possess operating parameters that are fixed under nominal voltage and load, specifically: starting with determined acceleration when power is established; travelling at a controlled cruising speed using traction means and/or brake means as a function of the speed reached; slowing down with determined deceleration; and braking with predetermined deceleration when power is removed.

The transport modules may comprise means for controlling starting acceleration, cruising speed, and deceleration, both while slowing down and while braking, so as to ensure that the module operates in application of operating parameters that are fixed, independently of the load of the module, of variations in the power supplied by the collector means, and of variations in the gradient profile of the track.

The transport system may comprise stations distributed along the track where passengers can board and alight.

The transport system may comprise means for detecting when a transport module is approaching a station to deliver a signal to means for causing the module in question to slow down to a slow speed or until it has stopped at the station for allowing passengers to board and/or alight. The transport module restarts automatically by means of a timed door-closing command which runs on from the start command. Elevator door type safety interlocks authorize this start command. They can be associated with a detector for detecting an object engaging a loading gauge at the end of a platform.

The transport system may comprise detector means for detecting the presence of a transport module in a power supply block.

The means for detecting that a block is occupied by a module can be of the axle counter type, of the optical detector type, or indeed of the track circuit type, or they can be implemented by means for processing an encoded signal conveyed by the electrical link between the transport module and the live rail.

The transport system can have a single running track, possibly with passing tracks if there are any intermediate stations, each end of the track being fitted with a device for turning a module around. The system can comprise two tracks, with loops interconnecting corresponding ends of the tracks. The running track can be a closed loop so as to constitute a ring. The system can also comprise two tracks that are interconnected at each end by a system of switches (points) or by a device for turning a module around.

Advantageously, the power supply blocks are formed by conductor rails mounted on an insulating support, the power supply blocks being electrically insulated from one another, the electric power collector means fitted to the transport modules being collector shoes placed so as to rub along the conductor rails of the power supply blocks.

The brake means of each transport module may comprise a spring-driven mechanical brake.

The transport system may comprise means for withdrawing transport modules from the running track, or for adding modules thereto.

The invention also provides a method of controlling electric self-propelled transport modules travelling individually on a running track provided with guide means, each transport module having collector means for picking up electric power supplied by a power supply system comprising a sequence of power supply blocks, the method being characterized in that the progress of transport modules is controlled by powering or unpowering various blocks, said transport modules travelling automatically on the track whenever the collector means are electrically powered and including brake means which come into operation whenever the collector means are no longer electrically powered.

According to another characteristic of the method of the invention, the presence of a transport module in a power supply block prevents power being applied to one or more blocks behind the occupied block so as to maintain a safety distance between the various transport modules travelling individually on the track.

According to another characteristic of the method of the invention, those power supply blocks that are not occupied by a transport module are not supplied with electric power, and vehicle progression is controlled by feeding power to some of the power supply blocks.

According to another characteristic of the method of the invention, by default the power supply blocks are electrically powered, and the progress of the vehicles is stopped by removing power feed to certain power supply blocks.

According to another characteristic of the method of the invention, a centralized control unit organizes travel of the transport modules on the basis of information concerning the position of each transport module.

BRIEF DESCRIPTION OF THE DRAWINGS

The invention will be better understood and other advantages and features will appear on reading the following description given by way of non-limiting example and accompanied by a drawing which is a diagram showing how a particular embodiment of an automatic and guided system for transporting people of the invention operates.

DETAILED DESCRIPTION OF AN EMBODIMENT OF THE INVENTION

The transport system comprises an installation made up of running tracks fitted with guide means. They can be constituted by running rails that also perform guidance. They can equally well be constituted by running tracks associated with distinct guidance means.

The accompanying figures shows a portion of an installation of a transport system of the invention in which the running track is constituted by two parallel stretches of rail 10 and 20. Two transport modules are shown, each constituted by a single vehicle 1 or 2.

The installation has a ground level electric power supply system 30 constituted by a sequence of power supply blocks 31 to 35 for the portion of the installation that is shown. The ground level electric power supply system 30 constitutes a third rail that is electrically in communication with collector shoes 3 and 4 corresponding to the vehicles 1 and 2 respectively. The collector shoes 3 and 4 are in electrical communication with an onboard power supply circuit given respective references 5 and 6, and with respective traction motors 7 and 8.

These onboard power supply circuits 5 and 6 control the operation of the traction motors 7 and 8 so that the vehicles 1 and 2 start with predetermined acceleration when current appears at the collector shoes 3, 4 and travel at a given cruising speed under nominal voltage. Each vehicle 1, 2 also has an electromechanically controlled spring-driven mechanical brake which acts when the collector shoe 3, 4 is no longer powered and which serves to brake the vehicles 1, 2 with predetermined deceleration.

The ground level electric power supply comprises a power supply line 40 for powering the various power supply blocks 31 to 35 via switch means given respective references 41 to 45, return being via one of the stretches of rail 10 or 20. The switch means 41 to 45 are connected to a centralized control unit 50 controlling the application and removal of voltage to each of the power supply blocks 31-35.

The installation has detector means 51-55 for detecting the presence of a vehicle 1, 2 in a power supply block 31-35. These detector means 51-55 are known in themselves and are, for example, of the axle counter type, of the optical detector type, or constituted by means for processing an encoded signal conveyed by the electrical connection between the transport module and the live rail.

The detector means 51-55 are advantageously placed at the junctions between successive power supply blocks so as to detect when a vehicle 1, 2 passes from one power supply block to another.

The detector means 51-55 are connected to the central control unit 50, which unit includes a computer that analyzes the signals issued by the various detector means 51-55 so as to deduce therefrom how the various vehicles 1, 2 are progressing and whether or not a vehicle 1, 2 is present in any particular power supply block 31 to 35.

Knowing the positions of the vehicles 1, 2 on the running track, the centralized control unit 50 manages progress of the vehicles 1, 2 by sending instructions to the switch means 41 to 45 for powering the power supply blocks on which the vehicles 1, 2 are to be found. The control unit 50 also ensures simultaneously that a safety distance is maintained between any two vehicles 1, 2 by preventing power being fed to one or more power supply blocks situated between two power supply blocks that are under power for causing two respective transport modules 1 and 2 to advance.

Thus, in the example shown in the accompanying figure, in order to cause the vehicle 1 to advance from power supply block 32 to power supply block 31, the central control unit 50 sends a signal to the switch means 42 so as to cause the power supply block 32 to be powered, thereby causing the vehicle to start with given acceleration under the control of its onboard power supply circuit 5. When the vehicle 1 reaches the detector means 52, a signal is sent to the central control unit 50 which then acts on the switch means 41 to cause the power supply block 31 to be powered, with the power supply block 32 then being unpowered after a time delay sufficient to ensure that the collector shoe 3 has already come into contact with the power supply block 31 by the time power feed to the block 32 is interrupted. Simultaneously with power supply block 32 being unpowered, the central control unit 50 ensures that no electric power can be fed from the line 40 to both blocks 32 and 33. As a result, any vehicle 2 running onto power supply block 33 would no longer be powered if vehicle 1 were still in power supply block 31, thus ensuring that a safety distance is maintained between the various vehicles 1 and 2. Naturally, the number of power supply blocks that are unpowered behind a block that is powering a vehicle is a function of the length of the power supply blocks relative to the length of the vehicle, and increases with decreasing length of power supply block relative to vehicle length. Furthermore, additional protection of the transport modules can be provided, by construction in each power supply block, by locally inhibiting any instruction to feed power to an appropriate number of power supply blocks located behind a powered block.

To identify passenger boarding and alighting zones, the installation can have a plurality of stations that are not shown in the accompanying figure. These passenger stations can advantageously be fitted with sensors or beacons for detecting the approach of a vehicle and for sending a signal to the central control unit 50 so that the power supply to the block on which the vehicle is to be found is interrupted and the vehicle comes to rest at the station.

The stations can be fitted with platform doors in order to further improve transport safety.

The vehicles can be programmed to have acceleration, cruising speed, and deceleration which are a function of the density of vehicles travelling on the running track. Depending on traffic density, a plurality of vehicle travel space-time relationships can be implemented.

In a variant embodiment, the central control unit 50 can maintain electric power supply to the blocks powering the vehicles 1, 2 as they approach stations, with the vehicles 1, 2 slowing down and stopping at the stations under the control of a determined operating sequence contained in the power supply circuit 5, 6 onboard the vehicles 1, 2, with said sequence being launched by the sensors or beacons situated on the track close to the stations.

The installation of the present invention possesses the advantage of simplicity and of being of low cost (no driver), the centralized control unit combining functions that are normally performed by signaling, automatic driving, and power supply. The transport system of the invention thus makes it possible to simplify the architecture of an automatic metro to a great extent.

Advantageously, information is transferred between the central control unit 50 and the detector means 51-55 using a bus type information network, said information network also providing information concerning the power supply state of the blocks 31 to 35 and being suitable for acting as a control channel for the switch means 41 to 45.

Naturally, the invention is not limited in any way to the embodiment described and shown which is given purely by way of example. Modifications are made possible, particularly from the point of view of how the various elements are made or by substituting technical equivalents, without thereby going beyond the field protected by the invention.

Thus, in the particular embodiment shown in the figures, the vehicles are of a length that is shorter than the length of a power supply block. Nevertheless, in a variant embodiment (not shown), the power supply blocks could be of a length that is shorter than the length of the vehicles.

The invention claimed is:

1. A system for automatic and guided transport of people, the system comprising:
    at least one running track having means for guiding transport modules, each transport module being constituted by a single self-propelled vehicle or a self-propelled vehicle associated with one or more other transport vehicles;
    an electric power supply system comprising a sequence of power supply blocks;
    electric self-propelled transport modules travelling individually along the running track and fitted with collector means that collect electric power supplied by the power supply blocks; and
    electric power distribution means comprising switch means which supply said electric power to various power supply blocks and which are controlled by a central control unit managing the progress of the transport modules by causing the various power supply blocks to selectively be in a powered state, in which electric power is applied to a power supply block, and an unpowered state, in which no electric power is applied to the power supply block, the presence of a transport module on a power supply block preventing power being applied to one or more blocks situated behind the block that is occupied so as to maintain a safety distance between the various transport modules travelling independently along the track,
    wherein each transport module is provided with a fixed onboard controller that controls starting acceleration, cruising speed, and deceleration, both while slowing down and while braking, of the transport module, each transport module being powered when a voltage on one or more electric power supply conductors is provided from a power supply block in the powered state, said transport modules moving automatically along the track when the collector means are electrically powered by the power supply block in the powered state, and including brake means that come into operation when the power supply block is in the unpowered state and the collector means are no longer powered with electricity,
    wherein the fixed onboard controller controls starting acceleration, cruising speed, and deceleration of the transport module independent of variations in the electric power supplied to the fixed onboard controller when the transport module is located on a power supply block in the powered state.

2. A system according to claim 1, wherein the controller includes operating parameters that are fixed under nominal voltage and load, such that the transport module is started with a determined acceleration when power is established, the transport module travels at a controlled cruising speed using traction means and/or brake means as a function of the speed reached, the transport module slows down with a determined deceleration, and the transport module is braked with a predetermined deceleration when power is removed.

3. A system according to claim 1, wherein the transport modules include means for controlling starting acceleration, cruising speed, and deceleration both while slowing down and while braking so as to ensure that the module operates in application of operating parameters that are fixed, independently of the load of the module, of variations in the power supplied by the collector means, and of variations in the gradient profile of the track.

4. A system according to claim 1, further comprising stations distributed along the track where passengers can board and alight.

5. A system according to claim 4, further comprising means for detecting when a transport module is approaching a station to deliver a signal to means for causing the module in question to slow down to a slow speed or until it has stopped at the station for allowing passengers to board and/or alight.

6. A system according to claim 1, further comprising detector means for detecting the presence of a transport module in a power supply block.

7. A system according to claim 1, wherein the at least one running track comprises a single running track, each end of the track being fitted with a device for turning a transport module around.

8. A system according to claim 1, wherein the at least one running track comprises two tracks interconnected at each end by means for turning a transport module around, loops interconnecting the corresponding ends of the tracks.

9. A system according to claim 1, wherein the power supply blocks are formed by conductor rails mounted on an insulating support, the power supply blocks being electrically insulated from one another, the electric power collector means fitted to the transport modules being collector shoes placed so as to rub along the conductor rails of the power supply blocks.

10. A system according to claim 1, wherein the brake means of each transport module comprise a spring-driven mechanical brake.

11. A system according to claim 1, further comprising means for withdrawing transport modules from the running track, or for adding modules thereto.

12. A method of controlling electric self-propelled transport modules travelling individually on a running track provided with guide means, each transport module having collector means for picking up electric power supplied by a power supply system comprising a sequence of power supply blocks, the method comprising:

controlling the progress of transport modules by causing various power supply blocks to selectively be in a powered state, in which the electric power is applied to a power supply block, and an unpowered state, in which no electric power is applied to the power supply block, wherein each transport module is provided with a fixed onboard controller that controls starting acceleration, cruising speed, and deceleration, both while slowing down and while braking, of the transport module, each transport module being powered when a voltage on one or more electric power supply conductors is provided from a power supply block in the powered state, said transport modules moving automatically along the track when the collector means are electrically powered by the power supply block in the powered state, and including brake means that come into operation when the power supply block is in the unpowered state and the collector means are no longer powered with electricity, wherein the fixed onboard controller controls starting acceleration, cruising speed, and deceleration of the transport module independent of variations in the electric power supplied to the fixed onboard controller when the transport module is located on a power supply block in the powered state.

13. A method according to claim 12, further comprising:

preventing power from being applied to one or more blocks behind an occupied block so as to maintain a safety distance between the transport modules travelling individually on the track in response to a transport module being present in the occupied block.

14. A method according to claim 12, wherein power supply blocks that are not occupied by a transport module are not supplied with electric power, and progression of the transport modules is controlled by feeding power to some of the power supply blocks.

15. A method according to claim 12, wherein the power supply blocks are electrically powered by default, and in that movement of the transport modules is stopped by removing power feed to certain power supply blocks.

16. A method according to claim 12, further comprising organizing, by a centralized control unit, travel of the transport modules on the basis of information concerning the position of each transport module.

* * * * *